Aug. 30, 1949.　　　C. F. SCHNUCK　　　2,480,513
PACKING FOR JOURNAL BOXES AND THE LIKE
Filed Feb. 27, 1945

Inventor
Carl F. Schnuck
By Rockwell & Bartholow
Attorneys

Patented Aug. 30, 1949

2,480,513

UNITED STATES PATENT OFFICE 2,480,513

PACKING FOR JOURNAL BOXES AND THE LIKE

Carl F. Schnuck, New Haven, Conn., assignor to Farrel-Birmingham Company, Inc., Ansonia, Conn., a corporation of Connecticut Application February 27, 1945, Serial No. 579,980

6 Claims. (Cl. 286—5)

This invention relates to sealing rings, and more particularly to an oil sealing ring to be applied to journal boxes for rotors such as mill rolls, for example, although, in certain of its aspects, the invention may be applicable to sealing rings for rotating shafts of other types.

Considerable difficulty has been experienced in the past in preventing the escape of oil about the bearings of a rotating roll or shaft, and this is particularly true in connection with heavy machinery wherein the necks or journals of the rolls are subjected to an oil bath. In such a case, there is nearly always a leakage of oil about the neck of the roll when the latter is flood-lubricated as is desirable with devices of this type.

Also, such rings are usually hard to install and particularly are difficult to replace. They usually encircle the roll shaft or neck and, hence, to insert them, it is necessary to take down the machine so that they may be slipped over the end of the neck.

It is contemplated by the present invention to overcome the disadvantages above referred to and provide a sealing ring which will effectively prevent the escape of oil about a shaft. Also, it is contemplated that the rings of the types illustrated in the present application may be made in sections or parts, and thus may be installed without a major takedown operation of the machine in that a worn or used ring may be removed and a new ring installed while the shaft is in place.

It is also contemplated by the present invention that the sealing ring be so constructed that it may effectively seal the oil chamber about the bearing neck or roll even though the latter may be subject to movement in its bearing. As is sometimes the case, for example, in a mill roll, the roll will assume a different position during operation then assumed when it is at rest and there is no work or material between the roll in question and its mate.

One object of the invention is to provide a new and improved oil sealing ring for rotors.

A still further object of the invention is to provide an oil sealing or packing ring for the journal boxes of rotors such that the journal boxes will be effectively sealed against the escape of oil and, at the same time, the ring or seal may be so constructed that it may be readily applied without removing the roll or rotor from its bearing.

To these and other ends the invention consists in the novel features and combinations of parts to be hereinafter described and claimed.

Figure 1:
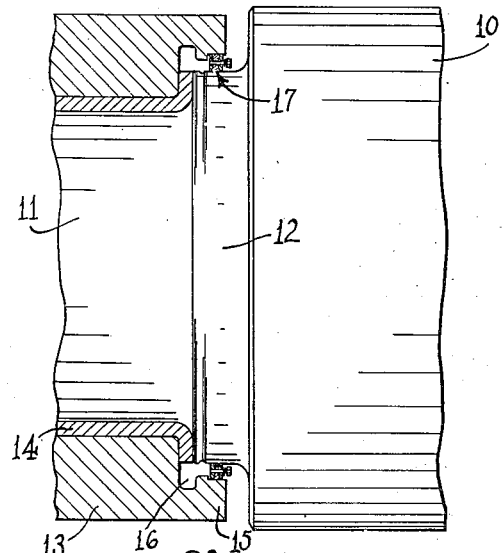
Fig. 1 is a fragmentary sectional view of one of the journal boxes of a mill roll illustrating my improved packing or sealing ring, the roll itself being shown in elevation.

To illustrate a preferred embodiment of my invention, I have shown a roll 10 such as a mill roll, for example, which roll is provided with a bearing neck 11 and a reduced portion 12 between the body or working part of the roll and the bearing neck. The bearing neck is shown as supported in a journal box 13, this box being provided with a cylindrical bearing ring or liner 14 surrounding the bearing neck 11.

In the form of my invention illustrated in the drawing, the journal box 13 is provided with a portion 15 extending over the reduced portion 12 of the roll in spaced relation thereto, and providing between this portion of the journal box and the portion 12 of the roll an annular space or recess 16 which would normally contain oil or lubricant resulting from flood lubrication of the bearing neck 11.

Between the portion 15 of the journal box and the portion 12 of the roll, sealing or packing ring is provided, this ring being designated generally by the numeral 17, and the invention of the present application is concerned particularly with the construction of this ring.

Figure 2:
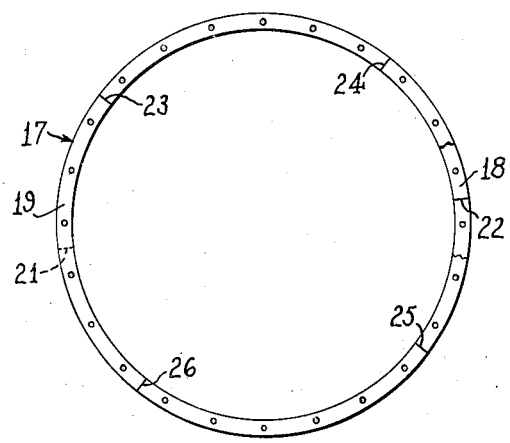
Fig. 2 is a face view of the packing or sealing ring, a part of the front portion thereof being broken away.
Figure 3:
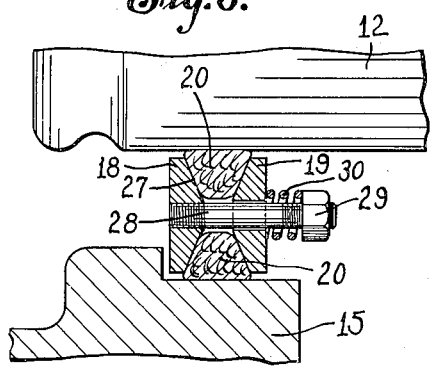
Fig. 3 is an enlarged sectional view of one portion of the sealing or packing ring, the latter being shown between the roll and a part of the journal box.

The ring 17 is shown in front elevation in Fig. 2 and in section in Fig. 3 and consists of two circular members 18 and 19, one at the front and one at the rear with packing material 20 compressed between them. The rear ring 1 may, as shown at Fig. 2, be made in sections and, as shown, consists of two semi-circular portions which meet at the lines 21 and 22 shown in Fig. 2. The front portion 19 may be also a multi-section member and, as shown, is made in four sections which meet at the lines 23, 24, 25 and 26. It will be apparent from Fig. 2 that the joints between the sections of one ring may be staggered with respect to those of the other ring portion, so that when the front and rear members 18 and 19 are secured together, a complete ring will be formed.

The inner surfaces of the members 18 and 19 are beveled as shown at 27, and these two portions of the ring are secured together by studs 28 threaded into one of the sections 18 and passing loosely through the other section 19. A nut 29 on the projecting end of the stud 28 acts upon a compression spring 30 which lies between the nut and the member 19 so as to urge the members toward each other to compress the packing rings 20. Thus the spring 30 will exert constant pressure upon the outer or front ring section 19 to compress the packings 20 and urge one thereof toward the roll and the other thereof toward the journal box. Tightening the nut 29, as will be obvious, increases the pressure of the rings upon the packing and urges the latter into close contact with the adjacent members to form a tight and effective seal.

It will also be apparent that with the elements 18 and 19 being made in sections, they may be removed from the roll without dismantling the machine or removing the bearing neck from the journal and also a new ring may be put into place with facility, thus greatly reducing the labor of replacing one of the seals as compared to that which would be necessary if the elements 18 and 19 were each formed as an integral circular member. With the packing rings 20 being compressed, as shown between the front and rear portions or ring sections 18 and 19, an effective oil seal will result.

Figure 4:
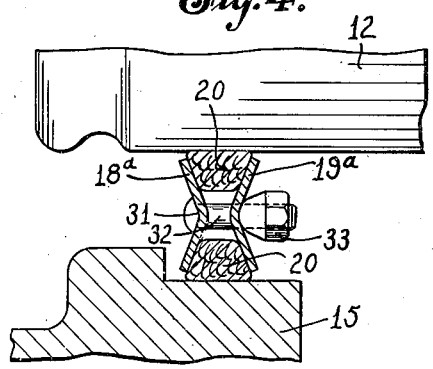
Fig. 4 is a view similar to Fig. 3 showing a modified form of my invention.

In Fig. 4 of the drawings, I have shown a modified form of my invention in which the packing or sealing ring is composed of front and rear sections 18ª and 19ª, these sections being dished or displaced inwardly at their central portions as shown at 31 to provide outwardly flaring seats or recesses for the packing material 20 which, it will be obvious, effects the same result as the bevel portions 27 of the elements 18 and 19. In this form of my invention a stud 32 may be secured to the ring 18ª and threadingly receive upon its end a nut 33 to compress the sections 18ª and 19ª upon the packing material 20.

The material of which the sections 18ª and 19ª is formed may be slightly resilient so as to effect continued spring pressure upon the packing material in a manner similar to that of the spring 30 shown in Fig. 3. It will also be understood that the elements 18ª and 19ª will be made in sections as described in connection with the members 18 and 19 so that they may be conveniently put into place without disassembling the parts of the machine.

Figure 5:
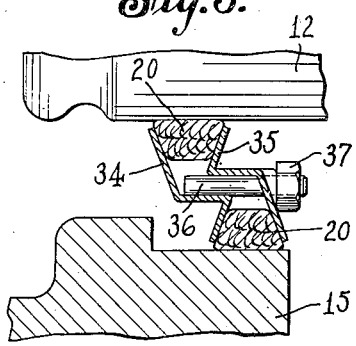
Fig. 5 is also a view similar to Fig. 3 showing a further modification.
Figure 6:
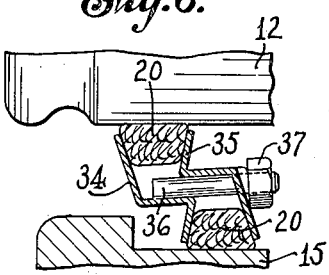
Fig. 6 is a similar view of the ring shown in Fig. 5 showing the parts in a different position.

In Figs. 5 and 6 of the drawing, I have shown another form of my invention in which the front and rear portions 34 and 35 of the sealing ring are roughly Z-shaped in cross section and present upwardly and downwardly flaring pockets or recesses to receive the packing material 20, which recesses will be offset from each other with respect to a plane transverse to the axis of the roll. A stud 36 is secured to the element 34 and passes loosely through the element 35 where it threadingly receives a nut 37 upon its extended end to compress the portions 34 and 35 upon the packing material 20 and force the latter into tight contact with the journal box and shaft.

It sometimes occurs that in the case of mill rolls, for example, the journal or bearing neck 11 will lie at the bottom of the journal box when the roll is at rest, but, when the machine is in operation, the roll neck or journal will be elevated and occupy a higher position. The sealing ring shown in Figs. 5 and 6 may adjust itself to these positions by reason of its shape. Pressure upon the upper and lower packing elements 20 will effect a turning moment of the inner and outer portions of the ring about the central portion due to the fact that one end of the ring is offset from that of the other. Thus the ring is shown in Fig. 5 in the position which it occupies when the roll journal is in an elevated position with respect to the journal boxes as is the case when the mill is in operation, while in Fig. 6 of the drawing the sealing ring is shown in the position assumed by it when the mill is at rest and the roll journal lies at the bottom of the box. Thus the ring itself may be distorted slightly by pressure on the opposite offset ends thereof and it is not necessary to depend entirely upon the packing to compensate for the difference in the positions of the roll journal in order to effect a tight seal in both positions. It will be understood that the members 34 and 35 are slightly resilient so that when the roll rises from the position shown in Fig. 6, the ring will expand and again assume the position shown in Fig. 5.

The packing material or gasket on the outer side of the sealing ring, i. e. that side adjacent the journal box, may be made of some oil-resistant resilient material as, for example, a synthetic rubber-like substance such as neoprene. The packing 20 on the inside of the ring will preferably be made of some resilient oil-resistant material suitable for contact with the rotating shaft. The pressure of the annular inner and outer members of the ring on the packings will serve to force them outwardly in contact with the journal box upon the outer side and with the rotating member on the inner side.

While I have shown and described some preferred embodiments of my invention, it will be understood that it is not to be limited to all of the details shown, but is capable of modification and variation within the spirit of the invention and within the scope of the claims.

What I claim is:

1. A sealing ring for shaft bearings or the like, said ring comprising a pair of opposed circular members, means extending between said members intermediate the inner and outer edges thereof to hold them in spaced relation, means providing an outwardly flaring annular pocket between said members to receive a ring of packing material, each of said members being formed in arcuate sections, the sections of one member spanning the joints between the sections of the other member whereby the sections of each member are secured together by the first-named securing means, and said members being yieldable in a direction away from each other under pressure on the packing ring.

2. A sealing ring for shaft bearings or the like, said ring comprising a pair of opposed circular members, said members having outwardly flaring opposed surfaces to provide outwardly flaring annular pockets to receive packing material, each of said members being formed of arcuately shaped sections, and means extending from one member to the other between said pockets and engaging both said members to hold them together, said members being yieldable outwardly under pressure on said packing material.

3. A sealing ring for the journals of mill rolls or the like, said ring comprising a pair of spaced-apart resilient annular members presenting inner and outer, oppositely facing, annular pockets therebetween, rings of packing material in said pockets, one of said pockets being offset from the other with respect to a plane transverse to the axis of said members, and means for securing said members together in spaced relation to clamp the packing rings in said pockets.

4. A sealing ring for the journals of mill rolls or the like, said ring comprising a pair of spaced-apart resilient annular members presenting inner and outer, oppositely facing, annular pockets therebetween, rings of packing material in said pockets, said pockets being spaced apart along the axis of the roll journal whereby pressure on said packing rings will tend to produce a turning moment about a point in the sealing ring intermediate said pockets, and means disposed between the packing rings to secure said members together.

5. A sealing ring for the journals of mill rolls or the like, said ring comprising a pair of spaced-apart resilient annular members presenting inner and outer, oppositely facing, annular pockets therebetween, rings of packing material in said pockets, each of said members being of Z-shaped formation in cross section whereby the pockets will be spaced along the roll axis when the sealing ring is in operative position, and means securing said members together.

6. A sealing ring for the journals of mill rolls or the like, said ring comprising a pair of spaced-apart resilient annular members presenting inner and outer, oppositely facing, annular pockets therebetween, rings of packing material in said pockets, said pockets being offset relatively to the axis of the ring whereby pressure on the packing rings in opposite directions will produce a turning moment of one packing ring about the other, and means securing said members together.

CARL F. SCHNUCK.

REFERENCES CITED

The following references are of record in the file of this patent:

UNITED STATES PATENTS

| Number | Name | Date |
|---|---|---|
| 285,139 | King | Sept. 18, 1883 |
| 569,247 | Smith | Oct. 13, 1896 |
| 976,204 | Negley | Nov. 22, 1910 |
| 1,139,823 | Thomas et al. | May 18, 1915 |
| 1,543,456 | Stirling | June 23, 1925 |
| 1,801,391 | Sheldon | Apr. 21, 1931 |
| 1,900,368 | Shiffer | Mar. 7, 1933 |
| 2,054,582 | Delaval-Crow | Sept. 15, 1936 |
| 2,097,943 | Zagorski | Nov. 2, 1937 |
| 2,312,648 | Jones | Mar. 2, 1943 |

FOREIGN PATENTS

| Number | Country | Date |
|---|---|---|
| 7,537 | Great Britain | 1899 |
| 428,872 | Great Britain | 1935 |